United States Patent Office 3,573,273
Patented Mar. 30, 1971

3,573,273
WATER-INSOLUBLE MONOAZO DYES CONTAINING 3-AMINO-2,1-BENZISOTHIAZOLE COUPLED TO AN N,N-DISUBSTITUTED ANILINE
Matthias Seedfelder, Ludwigshafen (Rhine), Erwin Hahn, Viernheim, Hessen, and Hans Guenter Wippel, Ludwigshafen (Rhine), Germany, assignors to Badische Anilin- & Soda-Fabrik Aktiengesellschaft, Ludwigshafen (Rhine), Rhineland-Pfalz, Germany
No Drawing. Filed May 23, 1968, Ser. No. 731,621
Claims priority, application Germany, June 3, 1967, P 16 44 061.2
Int. Cl. C09b 29/38; D06p 1/06, 1/08
U.S. Cl. 260—158                     4 Claims

ABSTRACT OF THE DISCLOSURE

Monoazo dyes of a 3-amino-2,1-benzisothiazole coupled to an N,N-disubstituted-aniline derivative, said dyes being especially useful for dyeing synthetic textile material of fiber-forming polyesters and polyamides and exhibiting good fastness properties.

This invention relates to dyes having the general Formula I:

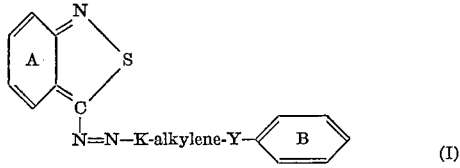

in which K denotes a radical capable of coupling and —Y— is one of the radicals having the formulae —O—, —S—, —SO— and —SO$_2$— or is a direct bond and in which the rings A and B may bear substituents which are not water-solubilizing.

Examples of substituents for the ring A are halogen atoms or nitro, cyano, alkyl, alkoxy, acylamino, carbalkoxy, alkylsulfone or trifluoromethyl groups and in particular methyl, methoxy, ethoxy, acetylamino, carbomethoxy, carboethoxy or methylsulfone groups.

The ring B may bear as substituents for example alkyl, alkoxy or nitro groups or halogen atoms. Methyl, ethyl, methoxy or ethoxy groups or chlorine or bromine atoms are suitable.

The part of the molecule having the formula

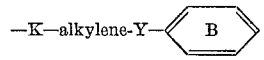

and stemming from the coupling component is preferably derived from an aniline having the Formula II or III:

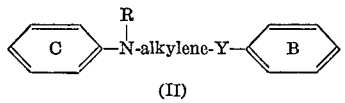

(II)

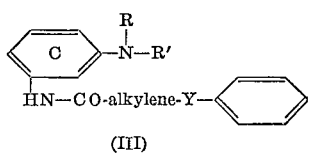

(III)

in which R and R' may be identical or different and denote unsubstituted or substituted alkyl radicals and R may denote a hydrogen atom and in which the ring C may also bear substituents, for example alkyl, alkoxy or halogen. Specific examples of substituents for the ring C are methyl, ethyl, methoxy or ethoxy groups or chlorine atoms.

Coupling components having the Formula II may also bear acylamino groups, such as acetylamino or propionylamino groups, as substituents.

Examples of unsubstituted or substituted alkyl radicals R and R' are methyl, ethyl, propyl, butyl, β-hydroxyethyl, β-methoxyethyl, β-ethoxyethyl, β-cyanoethyl β-chloroethyl, β-acetoxyethyl β-carbomethoxyethyl, β-carboethoxyethyl, β-hydroxypropyl, β,γ-dihydroxypropyl, β-acetylaminoethyl or γ-acetylaminopropyl radicals.

The alkylene radical in the above formulae preferably has one to four carbon atoms and may be linear or branched.

Specific examples of compounds having the Formula II or III are as follows:

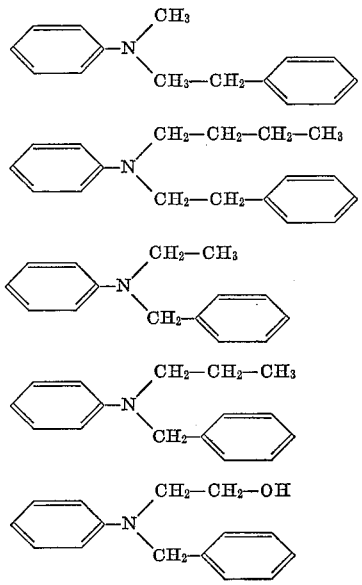
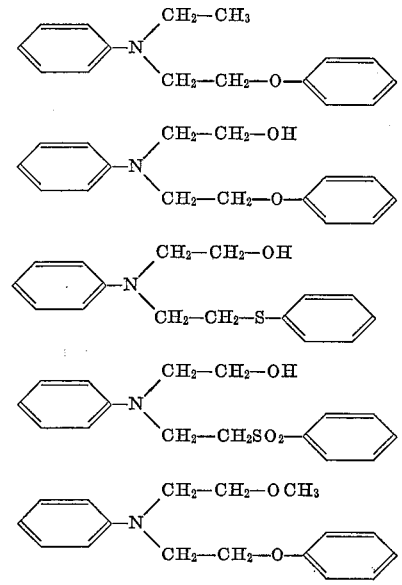

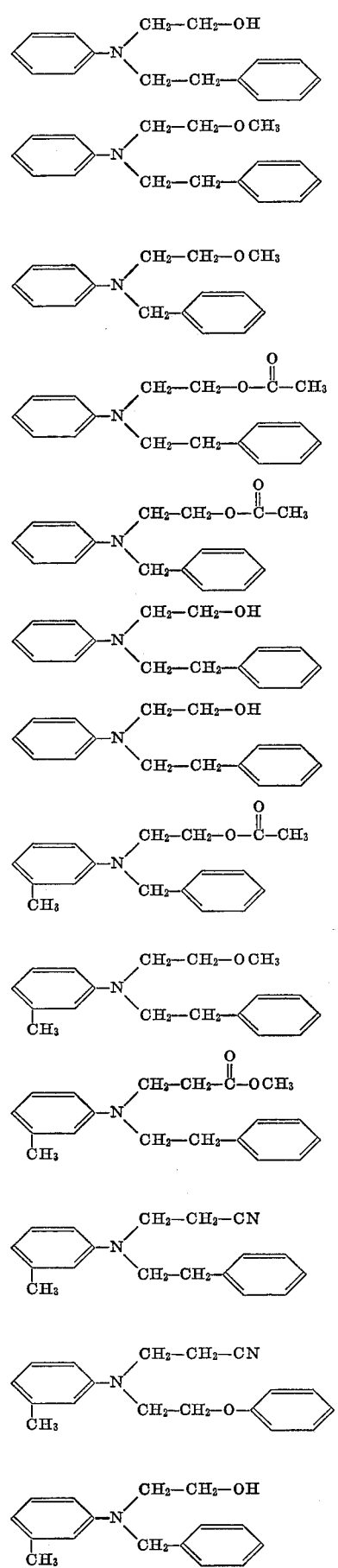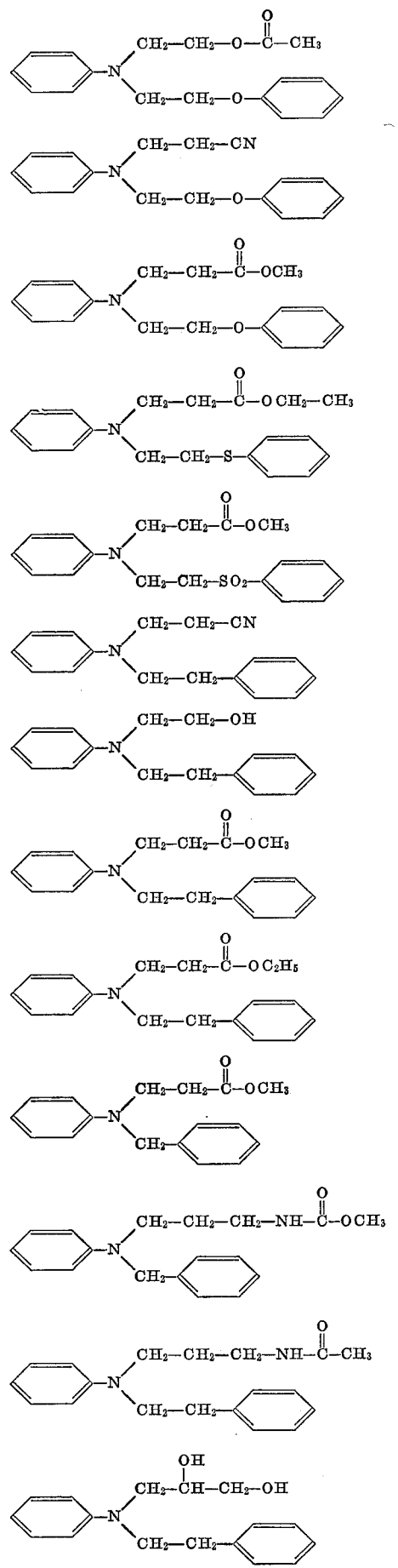

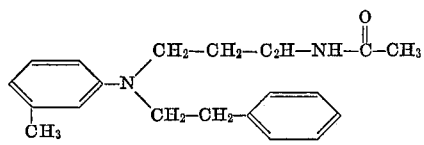
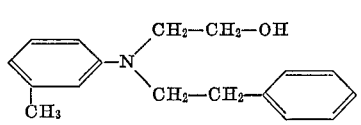
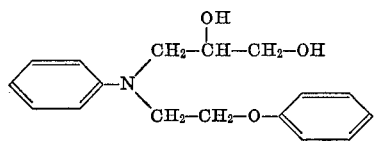
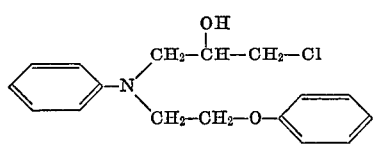
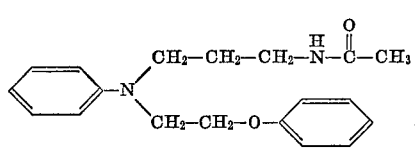
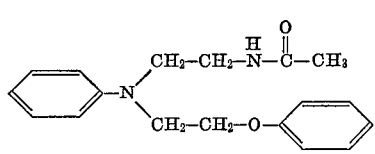
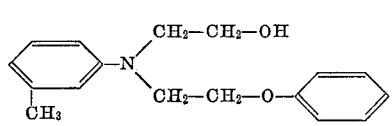
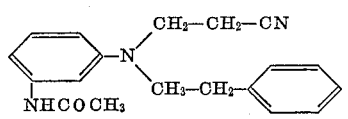
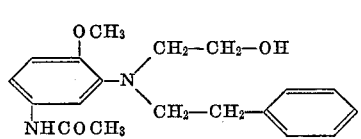
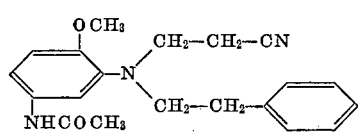
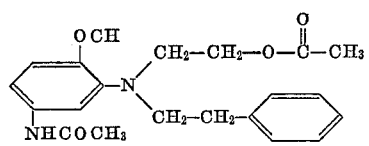
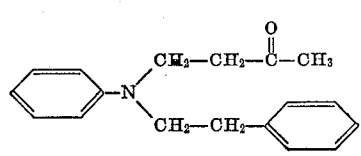
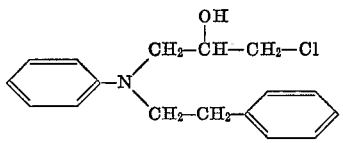
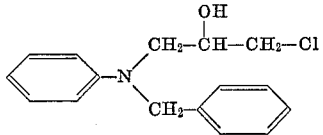
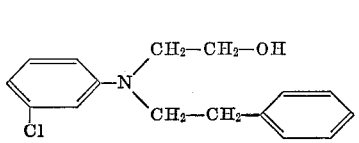
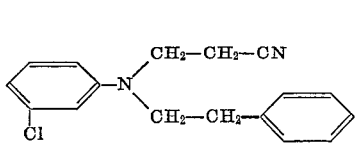
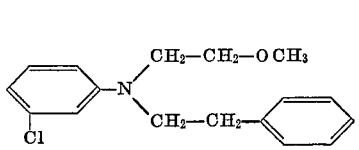
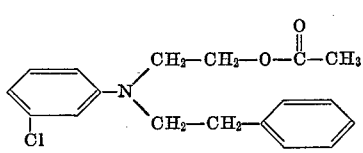
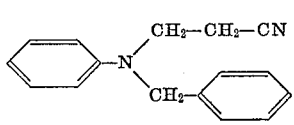
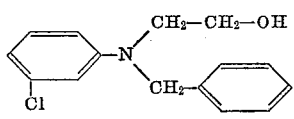
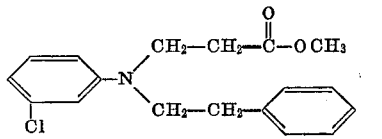
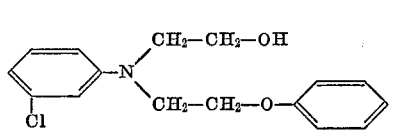
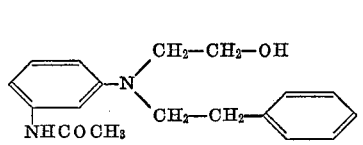
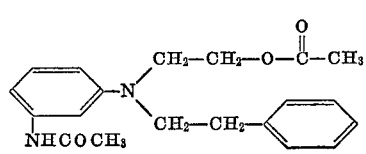

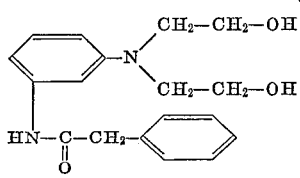
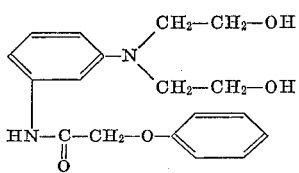
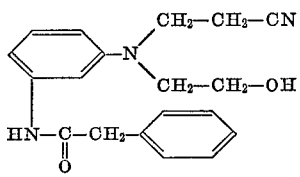
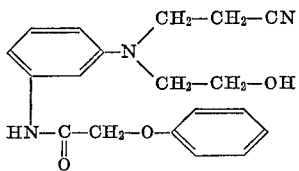
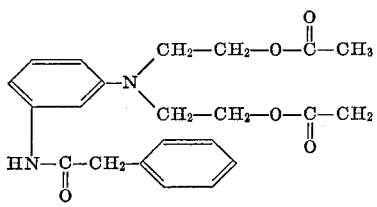
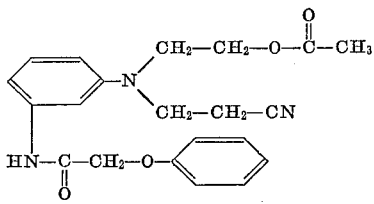

The diazo components of the new dyes having the Formula I are derived from amines having the general Formula IV:

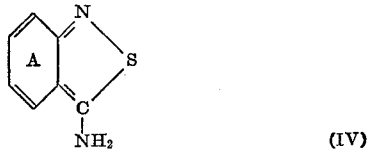

Specific examples are the following benzisothiazole derivatives: 3-amino-2,1-benzisothiazole, 3-amino-5-nitro-2,1-benzisothiazole, 3-amino-5,7-dibromo-2,1-benzisothiazole, 3-amino-5-nitro-7-chloro-2,1-benzisothiazole, 3 - amino-5-nitro-7-bromo-2,1-benzisothiazole, 3-amino-5-methyl - 2,1-benzisothiazole, 3-amino-5-chloro - 2,1 - benzisothiazole and 3-amino-7-chloro-2,1-benzisothiazole.

Dyes having the general Formula V:

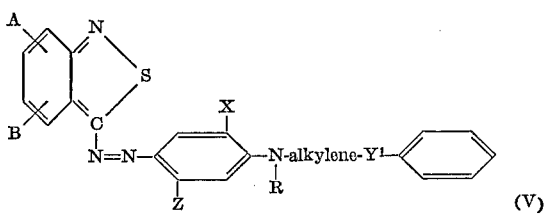

in which A and B may be identical or different and each may denote a nitro, methyl, methoxy, ethoxy, methylsulfonyl, ethylsulfonyl, cyano, carbomethoxy or carboethoxy group or a hydrogen, chlorine, bromine or fluorine atom; X denotes a hydrogen atom or a methyl, ethyl, methoxy or ethoxy radical; Z denotes a hydrogen, chlorine or bromine atom or a methyl, acetylamino, propionylamino, methoxy or ethoxy group; $Y^1$ denotes a direct bond or an oxygen or sulfur atom; and R denotes a methyl, ethyl, propyl, butyl, β-hydroxyethyl, β-methoxyethyl, β-ethoxyethyl, β-cyanoethyl, β-chloroethyl, β-acetoxyethyl, β-carbomethoxyethyl, β-carboethoxyethyl, β - hydroxypropyl, β,γ - dihydroxypropyl, β - acetylaminoethyl or γ - acetylaminopropyl, are of particular industrial interest.

Dyes having particularly valuable tinctorial properties are those having the Formula VI:

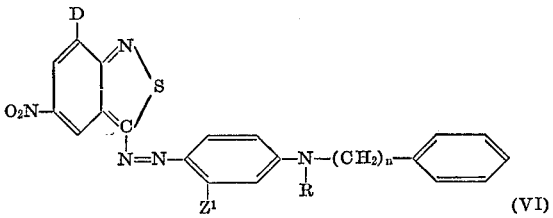

in which D denotes a hydrogen, chlorine or bromine atom, $n$ denotes one of the integers 1 and 2 $Z^1$ denotes a hydrogen or chlorine atom or a methyl group and in which R has the meanings given for Formula V.

Dyes having the Formula I are obtained when diazo compounds of amines having the Formula IV are reacted by a conventional method with a coupling component having the Formula VII:

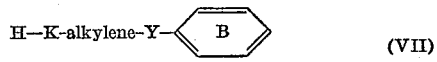

The dyes according to this invention are particularly suitable, especially in finely divided form, for dyeing materials, such as fibers, flock, filaments, thread, woven cloth or knitted fabric, of linear polyesters, such as polyethylene glycol terephthalate. Cellulose esters, such as secondary cellulose acetate or cellulose triacetate, or polyamides or mixtures of the said fibers, may also be dyed therewith. The dyes according to the invention go on very well and the dyeings prepared therewith have good fastness properties. In many cases the excellent fastness to wet and heat may be emphasized.

The invention is illustrated by the following examples. Parts and percentages mentioned in the following examples are by weight.

EXAMPLE 1

9.75 parts of 3-amino-5-nitro-2,1-benzisothiazole is introduced at 10° to 15° C. into 100 parts of 85% parts of 85% sulfuric acid. 15 parts of nitrosylsulfuric acid (having a content of 12.8% of free dinitrogen trioxide) is allowed to drip into the resultant solution at 0° to 5° C.

The clear diazo solution formed is stirred for three hours at 0° to 5° C., and then at this temperature a solution of 12.75 parts of N-β-oxyethyl-N-β-phenylethyl-meta-toluidine in 50 parts of glacial acetic acid is allowed to flow in, the whole is stirred for another thirty minutes and the solution is introduced into 1500 parts of ice and water. The dye, which is precipitated in crystalline form, is stirred for six hours, suction filtered, washed with water and dried at 50° C. under subatmospheric pressure. The dye thus obtained dyes polyethylene glycol terephthalate blue shades having very good wet and thermal fastness properties.

When the components set out in the following table are used instead of the coupling components specified in Example 1, dyes having similar properties are obtained.

| Ex. No. | Coupling component | Shade of dyeing on polyester |
|---|---|---|
| 2 | 3-methyl-phenyl-N(C$_2$H$_4$—CN)(C$_2$H$_4$—C$_6$H$_5$) | Navy blue. |
| 3 | phenyl-N(C$_2$H$_4$—O—CO—CH$_3$)(C$_2$H$_4$—C$_6$H$_5$) | Blue. |
| 4 | 3-methyl-phenyl-N(C$_2$H$_4$—O—CO—CH$_3$)(C$_2$H$_4$—C$_6$H$_5$) | Do. |
| 5 | phenyl-N(C$_2$H$_4$CO$_2$—C$_2$H$_5$)(C$_2$H$_4$—O—C$_6$H$_5$) | Navy blue |
| 6 | phenyl-N(C$_2$H$_4$—OH)(C$_2$H$_4$—O—C$_6$H$_5$) | Blue. |
| 7 | 3-chloro-phenyl-N(C$_2$H$_4$—OH)(C$_2$H$_4$—C$_6$H$_5$) | Blue violet. |
| 8 | phenyl-N(C$_2$H$_4$OH)(C$_2$H$_4$—O—C$_6$H$_5$) | Navy blue. |
| 9 | phenyl-N(C$_2$H$_4$—OH)(CH$_2$—C$_6$H$_5$) | Do. |
| 10 | phenyl-N(C$_2$H$_4$—CN)(CH$_2$—C$_6$H$_5$) | Blue violet. |
| 11 | phenyl-N(C$_2$H$_4$—O—CO—CH$_3$)(CH$_2$—C$_6$H$_5$) | Do. |
| 12 | 3-chloro-phenyl-N(C$_2$H$_4$—OH)(C$_2$H$_4$—C$_6$H$_5$) | Navy blue. |
| 13 | 3-chloro-phenyl-N(C$_2$H$_4$—O—CO—CH$_3$)(C$_2$H$_4$—C$_6$H$_5$) | Blue violet. |
| 14 | phenyl-N(C$_2$H$_4$—C$_6$H$_5$)(CH$_2$—CH(OH)—CH$_2$(OH)) | Navy blue. |
| 15 | 3-methyl-phenyl-N(C$_2$H$_4$—C$_6$H$_5$)(CH$_2$—CH(OH)—CH$_2$(OH)) | Blue. |
| 16 | phenyl-N(C$_2$H$_4$—C$_6$H$_5$)(C$_2$H$_4$—CH(OH)—CH$_2$—Cl) | Navy blue. |
| 17 | phenyl-N(C$_2$H$_4$—OCH$_3$)(C$_2$H$_4$—C$_6$H$_5$) | Do. |
| 18 | 3-(HNCOCH$_3$)-phenyl-N(C$_2$H$_4$—OH)(C$_2$H$_4$—C$_6$H$_5$) | Turquoise. |

EXAMPLE 19

13.7 parts of 3 - amino - 5 - nitro - 7 - bromo - 2,1-benzisothiazole is dissolved in 120 parts of concentrated sulfuric acid at 10° to 15° C. 50 parts of a mixture (17.3) of glacial acetic acid and propionic acid is allowed to drip into this solution at 0° to 5° C., diazotization then being carried out at this temperature by the gradual addition of 15 parts of nitrosyl sulfuric acid (having a content of 12.8% of free dinitrogen trioxide). After having been stirred for three hours, the resultant clear diazo solution is allowed to flow gradually into a solution of 14.85 parts of N - β - acetoxyethyl - N - β - phenylethyl - meta - toluidine, 250 parts of acetone, 10 parts of concentrated hydrochloric acid and 75 parts of ice. Stirring is continued for another thirty minutes and then 1000 parts of ice and water is added; the dye which is precipitated in crystalline form is suction filtered, washed and dried at 50° C. at subatmospheric pressure. This dye gives on polyethylene glycol terephthalate a dove blue dyeing having very good thermal fastness properties. When the coupling components set out in the foregoing table are used instead of N - β - acetoxyethyl - N - β - phenylethyl - meta - toluidine and the procedure of Example 19 is followed, dyes are obtained which have undergone bathochromic displacement of shade as compared with dyes prepared with 3-amino-5-nitro-2,1-benzisothiazole as diazo component.

EXAMPLE 20

11.45 parts of 3-amino-5-bromo-2,1-benzisothiazole is dissolved in 80 parts of concentrated sulfuric acid at 10° to 15° C. 50 parts of a mixture (17:3) of glacial acetic acid and propionic acid is first allowed to flow into this solution at 0° to 5° C. and then diazotization is carried out at the said temperature by the gradual addition of 15 parts of nitrosylsulfuric acid (having a content of 12.8% of free dinitrogen trioxide), after which the whole is stirred for another three hours. The resultant clear diazo solution is allowed to flow into a solution of 14.85 parts of N-β-acetoxyethyl-N-β-phenylethyl-meta-toluidine, 250 parts fo acetone, 10 parts of concentrated hydrochloric acid and 75 parts of ice while simultaneously allowing a solution of 164 parts of sodium acetate in 800 parts of water to flow in. The product is worked up by conventional methods and a dye is obtained which dyes polyamide red violet shades having good fastness properties.

We claim:

1. A dye having the formula

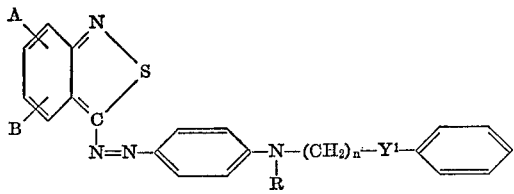

in which A and B each denotes hydrogen, chlorine, bromine, fluorine, nitro, methyl, methoxy, ethoxy, methylsulfonyl, ethylsulfonyl, cyano, carbomethoxy or carboethoxy, X denotes hydrogen, methyl, ethyl, methoxy or ethoxy, Z denotes hydrogen, chlorine, bromine, methyl, acetylamino, propionylamino, methoxy or ethoxy, $Y^1$ denotes oxygen, sulfur or a direct bond, R denotes methyl, ethyl, propyl, butyl, β-hydroxyethyl, β-methoxyethyl, β-ethoxyethyl, β-cyanoethyl, β-chloroethyl, β-acetoxyethyl, β-carbomethoxyethyl, β-carboethoxyethyl, β-hydroxypropyl, β,γ-dihydroxypropyl, β-acetylaminoethyl or γ-acetylaminopropyl, and $n$ denotes one of the integers 1 and 2.

2. A dye having the formula

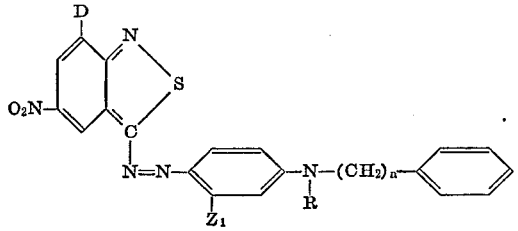

in which D denotes hydrogen, chlorine or bromine, $n$ denotes one of the integers 1 and 2, $Z^1$ denotes hydrogen, chlorine or methyl and R denotes methyl, ethyl, propyl, butyl, β-hydroxyethyl, β-methoxyethyl, β-ethoxyethyl, β-cyanoethyl, β-chloroethyl, β-acetoxyethyl, β-carbomethoxyethyl, β-carboethoxyethyl, β-hydroxypropyl, β,γ-dihydroxypropyl, β-acetylaminoethyl or γ-acetylaminopropyl.

3. The dye having the formula:

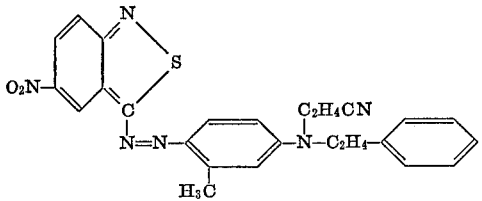

4. The dye having the formula:

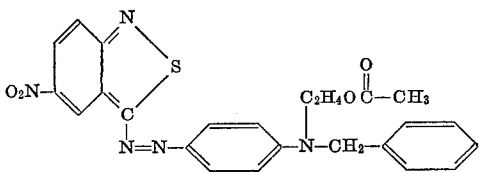

References Cited

UNITED STATES PATENTS 3,455,898 7/1969 Seefelder et al. _____ 260—158
3,478,011 11/1969 Artz _____ 260—158X

FOREIGN PATENTS 894,012 4/1962 Great Britain _____ 260—158

FLOYD D. HIGEL, Primary Examiner

U.S. Cl. X.R.

8—4, 41, 50; 260—306, 8, 465, 481, 490, 558, 559, 562, 570.5

PO-1050
(5/69)

UNITED STATES PATENT OFFICE
CERTIFICATE OF CORRECTION

Patent No. 3,573,273          Dated March 30, 1971

Inventor(s) Matthias Seefelder et al

It is certified that error appears in the above-identified patent and that said Letters Patent are hereby corrected as shown below:

Column 1, line 5, "Seedfelder" should read -- Seefelder --

Column 2, line 35, "$\beta$-cyanoethyl" should read -- $\beta$-cyanoe --; line 36, "$\beta$-acetoxyethyl" should read -- $\beta$-acetoxyet --.

Column 10, line 41, "(17.3)" should read -- (17:3) --.

Column 11, line 2, "fo" should read -- of --.

Signed and sealed this 24th day of August 1971.

(SEAL)
Attest:

EDWARD M. FLETCHER, JR.
Attesting Officer

WILLIAM E. SCHUYLER, JR.
Commissioner of Patents